United States Patent [19]

Spohr et al.

[11] Patent Number: 4,826,292

[45] Date of Patent: May 2, 1989

[54] DIFFUSION PLATE HAVING PREDETERMINED DIVERGENCE ANGLE

[75] Inventors: Reimar Spohr; Enrique Pfeng, both of Darmstadt; Dieter Bürchner; Poppl Thomas, both of Müchen, all of Fed. Rep. of Germany

[73] Assignee: Gesellschaft für Schwerionenforschung mbH, Darmstadt, Fed. Rep. of Germany

[21] Appl. No.: 931,127

[22] Filed: Nov. 17, 1986

[30] Foreign Application Priority Data

Nov. 22, 1985 [DE] Fed. Rep. of Germany ....... 3541327

[51] Int. Cl.$^4$ .......................... G02B 27/00; B44C 1/22
[52] U.S. Cl. .................................... 350/321; 350/286; 156/628; 430/946
[58] Field of Search ............... 350/321, 320, 417, 286, 350/452; 430/946, 290, 297, 322, 323, 396; 156/628, 640, 643, 663

[56] References Cited

U.S. PATENT DOCUMENTS

| | | | |
|---|---|---|---|
| 3,740,119 | 6/1973 | Sakurai et al. | 350/286 |
| 3,779,779 | 12/1973 | Landsman | 430/323 |
| 3,782,940 | 1/1974 | Ohto et al. | 430/323 |
| 4,268,347 | 5/1981 | Stephens | 156/628 |
| 4,524,127 | 6/1985 | Kane | 430/946 |
| 4,528,260 | 7/1985 | Kane | 430/323 |
| 4,551,418 | 11/1985 | Hult et al. | 430/322 |

Primary Examiner—John K. Corbin
Assistant Examiner—Loha Ben
Attorney, Agent, or Firm—Spencer & Frank

[57] ABSTRACT

A diffusion plate useful for capturing a real image in an optical system. The plate has a roughened semi-transparent surface for diffusing incident radiation. The surface is comprised of cones etched therein for form a roughness. The cones have a geometry and average center-to-center distances which are precisely predetermined to correspond with either a desired angle of divergence or with a desired diffusion intensity.

19 Claims, 6 Drawing Sheets

DIFFUSION PLATE HAVING PREDETERMINED DIVERGENCE ANGLE

BACKGROUND OF THE INVENTION

The present invention relates to a diffusion plate which can be used to capture a real image in an optical system and to a method of manufacturing such a diffusion plate.

Diffusion plates are intended to diffuse visible light over a defined divergence angle in the forward and reverse directions. The phase information of the incident lightwave is then destroyed by the diffusion at individual diffusion centers.

In the past, a semi-transparent plate having a roughened surface was used as a diffusion plate for capturing a real image in an optical system, with the incident radiation being scattered by such a plate to a greater or lesser degree. More recently, conventional diffusion plates are provided with roughened, or periodic surface structures. These diffusion plates suffer from certain drawbacks.

Diffusion plates provided with statistical roughening are produced by etching or mechanical grinding and appear grainy if the incident light enters through a small aperture. Moreover, relatively strong scattering is required to completely destroy the phase relationship between the incident light and the transmitted light. This causes light to be lost for the subsequent optical system.

In plates provided with periodic surface structures, the entrance pupil of the subsequent optical system is not illuminated uniformly and a refracted image appears in the entrance pupil. To obtain optimum performance, however, the entrance pupil must be illuminated uniformly.

It is known, in principle, to produce etched cones or conical holes in glass by means of ion irradiation and subsequent etching in hydrofluoric acid. However, glass plates treated in this manner do not offer any particular advantages, compared to conventional glass plates, for use as diffusion plates since the cone angles are fixed. In common window glass, for example, the etched cones have an aperture angle of about 70°.

Further, it is known to treat optical surfaces against reflection by irradiation with heavy ions and subsequent etching. The basic principle here is the removal of reflective properties by a refraction index which changes with the depth of the material. In such an anti-reflection treatment, the incident light should be diffused or reflected as little as possible, and the phase information of the incident light should remain completely unchanged.

According to the present invention, recesses in diffusion plates must always be wider than they are deep to achieve their intended purpose. In contrast thereto, the recesses of a surface treated against reflection are always more deep than wide. In the above-mentioned anti-reflection treatment, the resulting structures must be spaced laterally from one another at distances which are significantly smaller (e.g. 10 times smaller) than the length of a lightwave, so as to diffuse the incident lightwave as little as possible. Moreover, arbitrary depth structuring is sufficient for an anti-reflection treatment, as long as the transition from an average density of $\rho 0$ to the average density of the anti-reflection treated material occurs only gradually at a depth which corresponds to, or is greater than, the wavelength.

Finally, in an anti-reflection treatment of surfaces by means of irradiation with heavy ions, the nuclear trace density must be at least $10^{10}/cm^2$. In a dosage range below $10^{10}$ ions/$cm^2$, small scattering objects (smaller compared to the wavelength of light) would act as diffuse scatterers and would destroy the phase coherence of the incident light. Thus, below an irradiation density of $10^{10}$ ions/$cm^2$ an undesirable diffusion background appears during an anti-reflection treatment.

In light of the above, such methods for producing non-reflective surfaces by means of ion irradiation and etching do not provide any guidance for the production of ground glass diffusion plates which must serve precisely opposite purposes. The process steps employed in an anti-reflection treatment are not only unable to improve the diffusion characteristics of a surface, but also are not permitted to improve such characteristics.

SUMMARY OF THE INVENTION

Based on the above state of the art, it is an object of the present invention to provide a ground glass diffusion plate having diffusion characteristics which are considerably improved compared to prior art plates provided with statistical roughening or periodic surface structures.

The above and other objects are accomplished according to the invention by the provision of a diffusion plate useful for capturing a real image in an optical system, wherein the plate has a roughened semi-transparent surface for diffusing incident radiation, and wherein the surface additionally comprises cones etched therein to form a roughness, the cones having a geometry and average center-to-center distances which are precisely predetermined to produce diffused radiation having either a desired angle of divergence or a desired intensity.

In a further aspect of the invention, a method is provided for producing a diffusion plate of the above type which includes the steps of:

(a) irradiating a surface of a light transmitting material with heavy ions perpendicularly to such surface and producing latent nuclear traces of a certain depth in the material;

(b) tempering the irradiated surface for a predetermined time and at a predetermined temperature to partially cure the nuclear traces;

(c) etching the surface bearing the nuclear traces to form etched cones in the areas of the nuclear traces, the etching being carried out until the apertures of the cone angles overlap partially or completely.

In this way a diffusion plate is created on which the roughened portions, or diffusion characteristics, can be determined so that the angle of divergence of the diffusion plate can be precisely adapted to a subsequent optical system.

In a diffusion plate according to the invention, the recesses, i.e. the conical holes in the diffusion plate, are always wider than they are deep, the lateral dimensions of the novel structures, such as the diameter of the holes and the average centerr-to-center spacing of the holes are always in the same order of magnitude as the wavelength of light or greater than this wavelength. The nuclear trace density and the ion radiation producing the nuclear traces must not be greater than $10^8$ ions/$cm^2$, since otherwise too much diffuse scattering would occur over the entire space angle.

The particular advantages of the diffusion plate according to the invention are:

(1) the divergence angle can be predetermined since the tempering process permits the angle of the etched cone to be set at an angle between 180° and the angle of the untempered material.

(2) there is uniform scattering because "strict" and inwardly "bulging" surfaces each formed from etched cones are statistically distributed, and therefore no refraction takes place.

(3) the resolution capability can be predetermined because by preselecting the radiation dose and the etching process, the average center-to-center spacing of the etched cones can be set with precision.

In summary, the differences between the novel diffusion plate of the invention and prior art anti-reflection surfaces can be tabulated as follows:

| Ground Glass Diffusion Plate According to the Invention | Prior Art Anti-Reflection Coating on Optical Surfaces |
| --- | --- |
| phase information destroyed | phase information remains |
| etched recesses are more wide than deep | etched recesses are more deep than wide |
| nuclear trace density < $10^8/cm^2$ | nuclear trae density > $10^8/cm^2$ |
| hole diameter and spacing $\geq$ wavelength of light | hole diameter and spacing << wavelength of light ($\leq 1/10$) |
| cone angle >> 15° to 160° | cone angle $\approx$ 5° |

DESCRIPTION OF THE PREFERRED EMBODIMENTS

Figure 1:
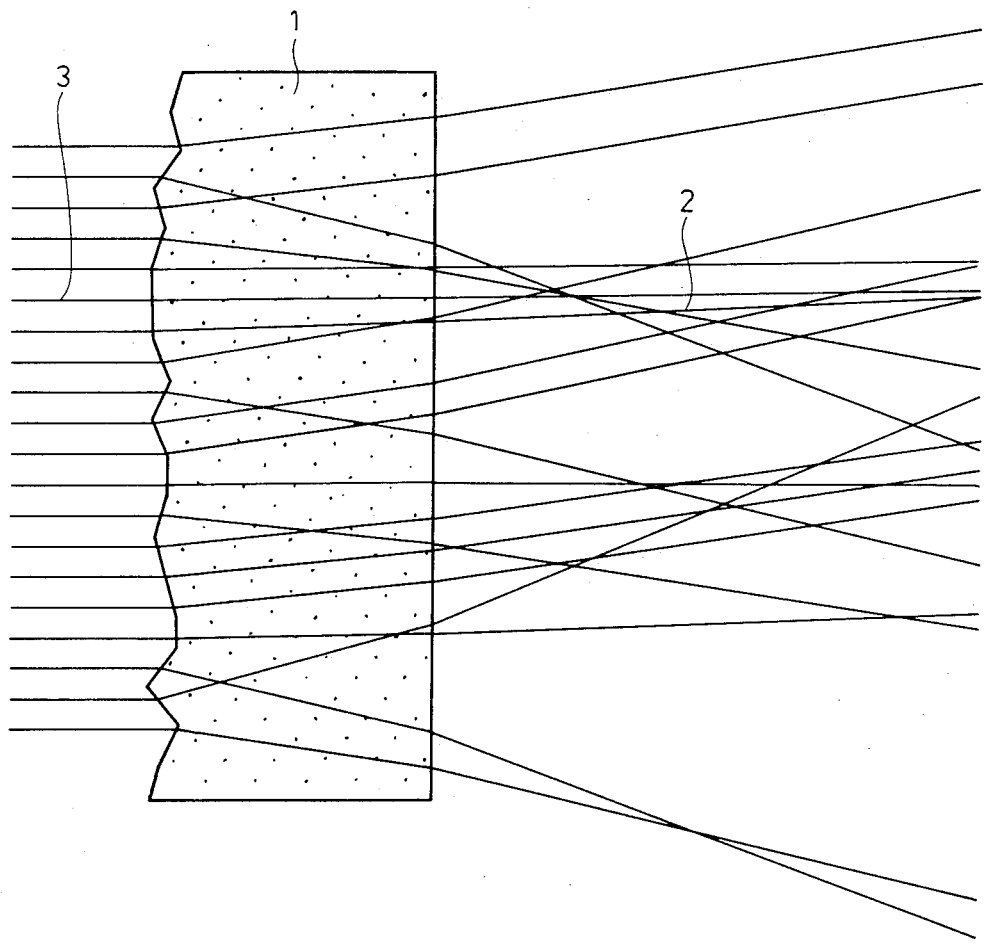
FIG. 1 is a schematic showing a sectional view of a conventional diffusion plate having a rough surface.

FIG. 1 shows a conventional diffusion plate 1 in which incident radiation 3 is scattered to produce diffused radiation 2 over a broad, poorly definable space angle range, permitting a certain amount of diffused radiation to be lost relative to a subsequent optical system.

Figure 4:
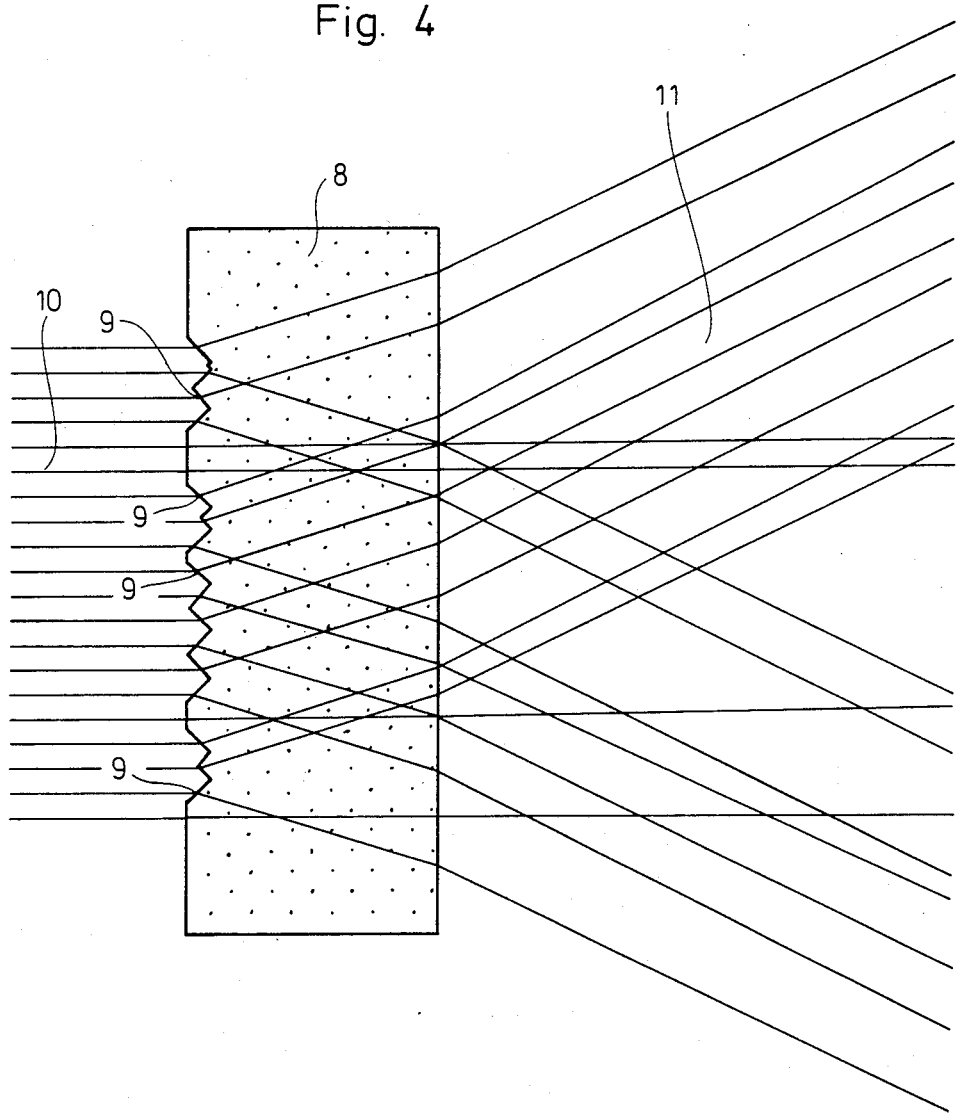
FIG. 4 is a schematic showing a sectional view of a diffusion plate provided with defined cones according to the present invention and illustrating the relationship between incident and transmitted beams.

FIG. 4 illustrates one embodiment of a novel diffusion plate 8 according to the invention. Diffusion plate 8 is comprised of nuclear trace sensitive material which has been irradiated with ions of a defined energy and nuclear charge. The ion beam is made to impinge at a defined angle on the nuclear trace sensitive material to create latent nuclear traces. The ion dosage is selected so that, depending on the diameter of the later produced etched cones, adjacent etched cones completely overlap one another.

To produce a roughness comprised of "strict" cones (i.e., a cone having a v-shaped cross section), the nuclear trace material is subjected to a defined tempering process in which the latent nuclear traces are partially cured. A subsequent, selective etching process then results in cones having significantly larger cone angles. The tempering process allows the cone angle to be accurately set.

Figure 2:
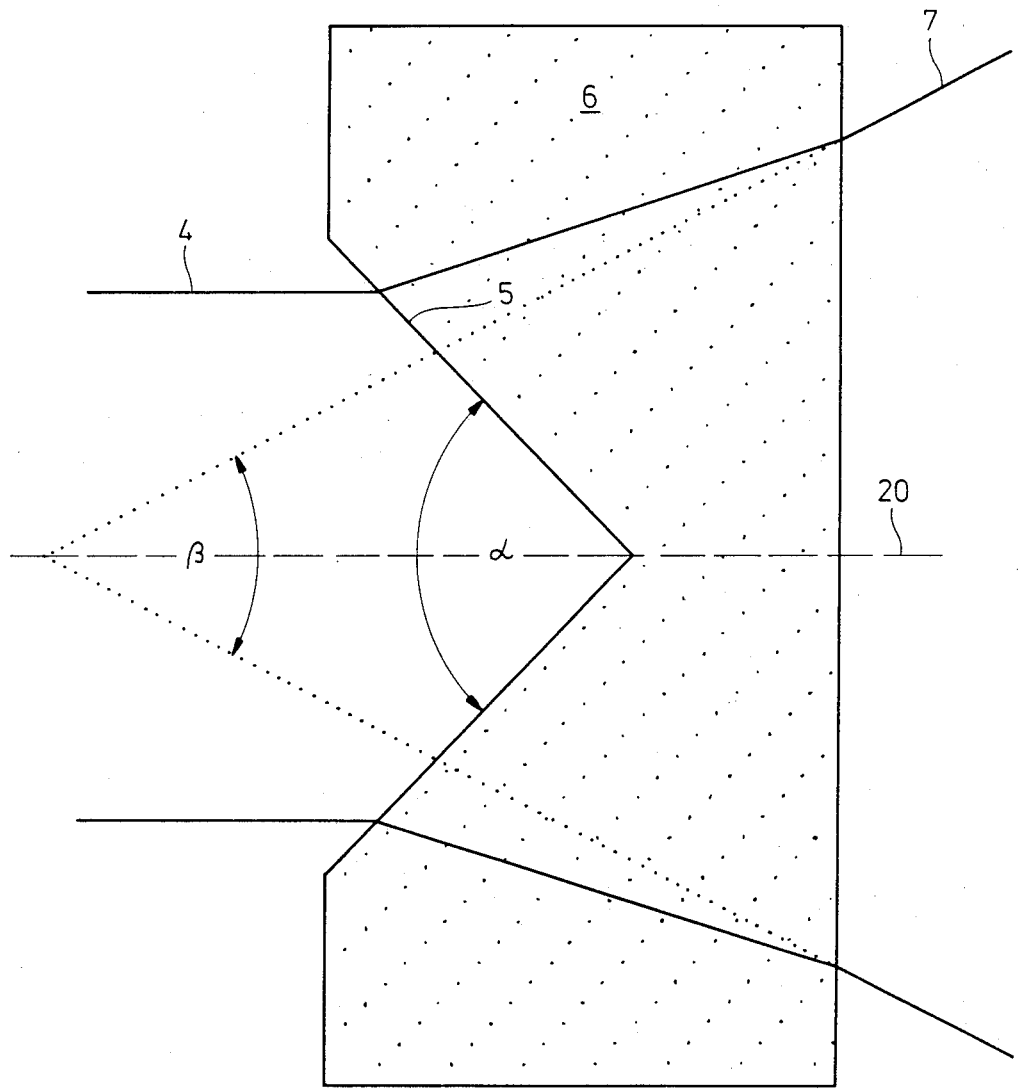
FIG. 2 is a schematic showing the refraction of a parallel bundle of light at a "strict", etched cone according to the principles of the invention.

Referring to FIG. 2, there is shown a diffusion plate 6 and one of a plurality of etched cones 5 each having a cone angle $\alpha$. Incident radiation 4 is refracted at each individual etched cone 5 and leaves diffusion plate 6 as a transmitted light bundle 7, defining a radiation cone having a cone angle $\beta$. That is, the etched cone 5 having a cone angle $\alpha$ diffuses a light bundle impinging parallel to its cone axis 20 to produce a diffused cone having a cone angle $\alpha$ (also referred to as an "aperture" angle or "angle of divergence".)

Figure 3:
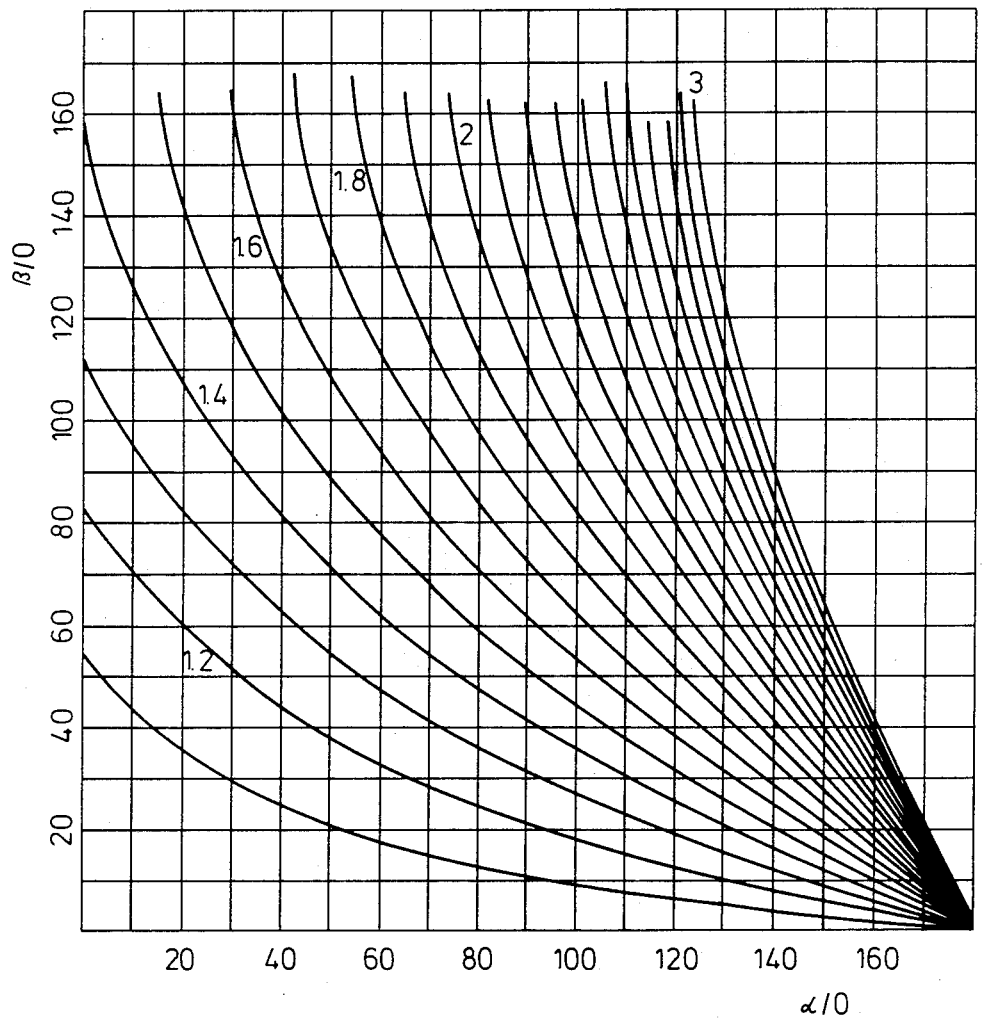
FIG. 3 is a graph showing, with respect to the geometry of FIG. 2, the cone angles of a diffused bundle of light as a function of the cone angle of the etched cones for various indices of refraction (n) in the glass employed, from n=1.1 to n=3.0 where $\alpha$=cone angle of the etched cone in degrees; and $\beta$=cone angle of the diffused light bundle in degrees.

The relationship between cone angle $\alpha$ of etched cone 5 and cone angle $\beta$ of the transmitted light bundle 7 is given by the following equation which is shown graphically in FIG. 3 for various types of glass having indices of refraction n varying between 1.1 and 3.0.

$$\beta = 2 \cdot \arcsin \{n \cdot \cos [\alpha 2 + \arcsin (\cos (\alpha/2)/n)]\} \quad \text{Eq. (1)}$$

$$\beta \rightarrow (180 - \alpha) \cdot (n-1) \text{ for } \alpha \rightarrow 180° \quad \text{Eq. (2)}$$

FIG. 4 shows in schematic form a diffusion plate 8 with etched cones 9 which are produced by superposing many such etched cones 5 according to FIG. 2. Etched cones 9 therefore each have a precisely given cone geometry and diffuse incident radiation 10 over a precisely defined space angle range, i.e. the cone angle $\beta$ of the diffused radiation 11 is determined precisely by the cone angle $\alpha$ of the etched nuclear traces. Typical values for the angle of divergence (cone angle) of the diffused radiation 11 are $\beta = 13.2°$ for viewfinder cameras and at $\beta = 8.0°$ for movie cameras.

Figure 5:
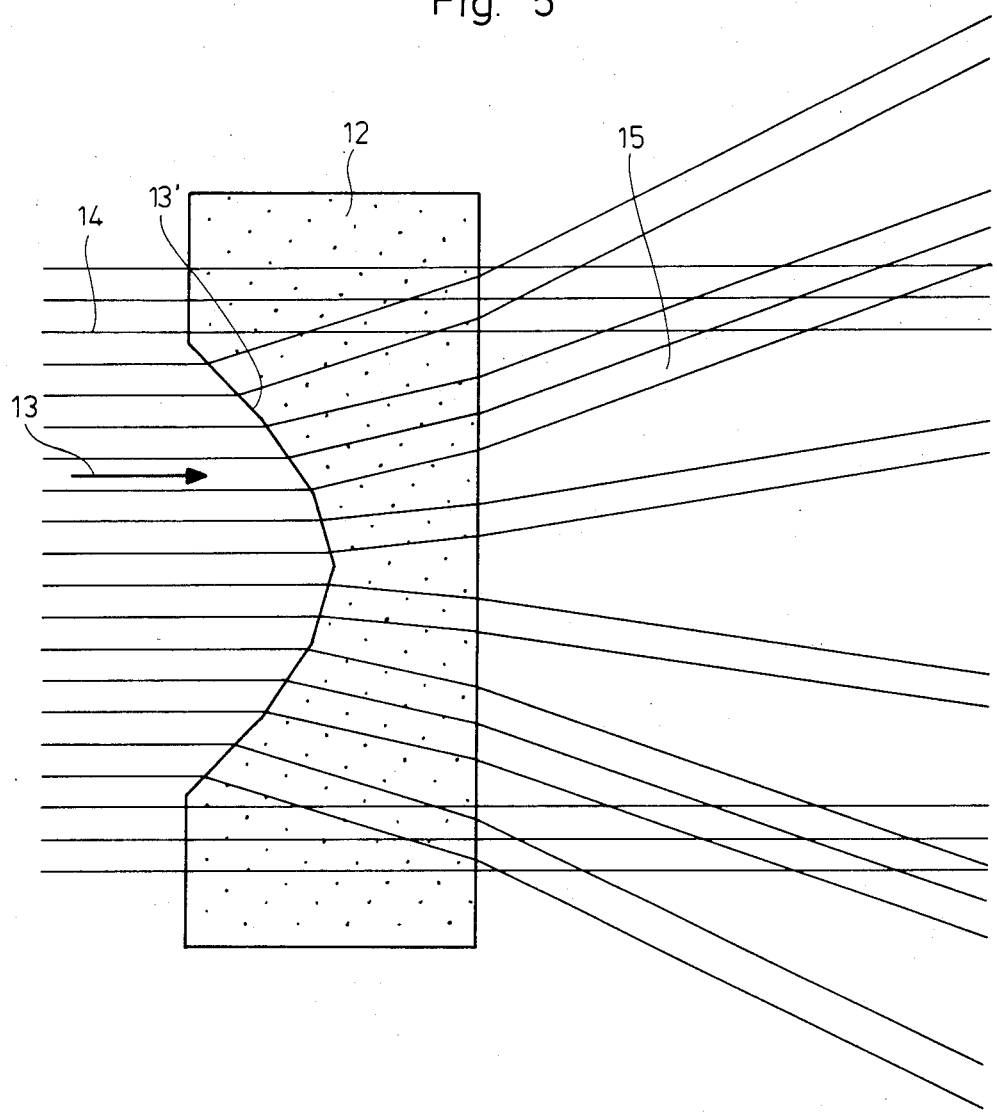
FIG. 5 is a schematic showing a sectional view of a diffusion plate provided with "bulging" etched cones according to the invention and illustrating the refraction of an incident parallel light bundle.

According to a further aspect of the invention a further degree of freedom in setting the angle of divergence can be introduced by variation of the shape of the cone generating surface to produce a roughness comprised of inwardly "bulging" surfaces each formed from etched cones. FIG. 5 shows a diffusion plate 12 having one such "bulging" surface 13 with a generally parabolic generating surface 13' which may selectively be formed, for example, by stepwise starting of the tempering and etching processes or by continuous etching with continuous or stepwise changes in the composition of the etching fluid (e.g. decreasing the selectivity of the etching fluid.)

By stepwise tempering (annealing) and etching we understand a succession of annealing and etching processes at different defined times and defined temperatures in order to obtain a given shape.

Accordingly, the shape of the generating surface of cone 13' in diffusion plate 12 changes in steps or becomes continuously flatter toward the center of the cone. This shape offers the particular advantage of diffusing the incident light bundle 14 to produce diffused radiation 15 over an arbitrary, but precisely definable angular range from predetermined lower and upper limit angles as shown in FIG. 5. The generating surface may also have a spherical shape.

An example for the production of a novel diffusion plate according to the invention is described below:

Common glass is irradiated perpendicularly to its surface with uranium ions of a specific energy of 14 MeV/nucleon. (As a general matter the energy may be between 0.5 and 50 MeV/nucleon.) The particle dose is $10^6$ ions/cm$^2$. (Generally the particle dose is between $10^4$ and $10^8$ ions/cm$^2$.) The length of the resulting latent nuclear traces is then about 100 μm (generally between 5 and 500 μm). The irradiated glas is tempered for one hour (generally between 100 hours and 1 minute) at 400° C. (generally between 300° and 500° C.). This reduces the nuclear trace etching rate in a defined manner.

The irradiated and tempered glass is etched in a mixture of 90 parts 20% hydrofluoric acid and 10 parts 37% hydrochloric acid. The duration of etching is 7 minutes. The resulting etched nuclear traces produce cones having a diameter of 21.3 μm. The resulting one has an angle of about 70°. Its depth is 15.2 μm. The index of refraction of the glass is n=1.5. This yields a divergence angle β of the diffracted light beam of about 68°.

In this example the tempering process is used to precisely set the cone angle. For example, tempering for 0.5 hour at 400° C. results in a cone angle of 139°. Tempering for 1 hour at 400° C. results in a cone angle of 143°. Tempering for 2 hours at 400° C. results in a cone angle of 153°.

The etching process according to the invention results in etched cones which, compared to prior art methods, are flatter and have greatly enlarged cone angles.

Figure 6:
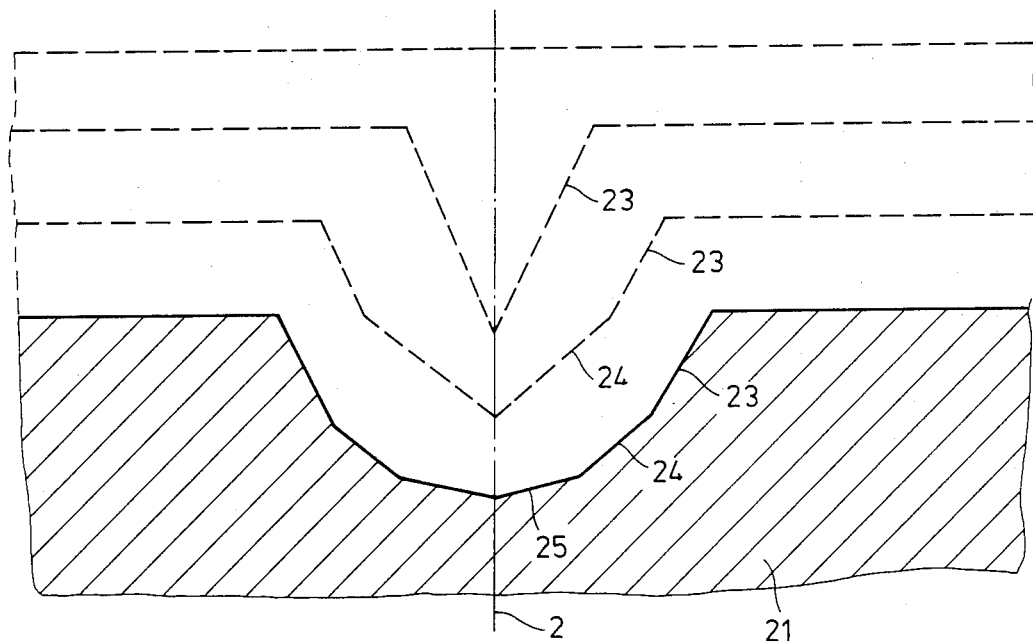
FIG. 6 is a schematic illustrating the method of making a diffusion plate provided with "bulging" etched cones according to the invention.

An example of such a process referring to FIG. 6 is given in the following:

(1) The sample (soda lime glass) 21 is irradiated with $10^5$ Uranium ions per cm$^2$ of an energy of 1.4 MeV/nucleon. This leads to the latent nuclear trace 22.
(2) The sample is etched for 1 minute in 20% HF+5% H$_2$SO$_4$ at 20° C. This yields a cone angle 23 of about 70°.
(3) The sample is annealed for 30 min. at 400° C.
(4) The sample is etched for 1 minute in 20% HF+5% H$_2$SO$_4$ at 20° C. This yields a cone angle 24 of 139° and leaves the previous cone angle unchanged.
(5) The sample is annealed for 30 min. at 400° C.
(6) The sample is etched for 1 minute in 20% HF+5% H$_2$SO$_4$ at 20° C. This yields a cone angle 25 of 143° and leaves the previous cone angles unchanged.

Diffusion plates having statistically distributed etched recesses in the shape of cones, or a parabolically or spherically inwardly bulging profile according to the invention have many uses, of which the following are examples:

a ground-glass diffusion plate having the above-described etched recesses at an average center-to-center distance of 5 μm to 30 μm for a reflex camera;

a ground-glass diffusion plate having the above-described etched recesses at an average center-to-center distance of 3 μm to 10 μm for a motion picture camera;

a ground-glass diffusion plate having the above-described etched recesses at an average center-to-center distance of 10 μm to 100 μm for capturing images in transmitted light observation;

a back-scattering ground-glass diffusion plate having the above-described etched recesses at an average center-to-center distance of 10 μm to 100 μm.

In summary, a diffusion plate according to the invention exhibits the following novel features:

(1) Etched cones are made in the surface of the plate to form the roughnesses, with the cone angles, and other cone geometry, as well as average center-to-center distances of the recesses being precisely set for each desired divergence angle of the diffused radiation transmitted by the diffusion plate.

(2) The apertures of the etched cones overlap completely or partially with a predeterminable surface coverage. Therefore, a certain portion of the incident radiation can be diffused and the remaining portion can be permitted to pass without being diffused.

(3) The etched cones may have bulging parabolically or spherical shape surfaces.

(4) The cone geometry of all etched cones may be identical.

(5) The cone geometry of various etched cones may be different.

Further, smaller etched cones may be introduced into the cone surfaces of larger etched cones, with the center axes of the smaller etched cones being oriented parallel or at an angle to those of the larger cones; the cone angles and cone geometry or spacing of these smaller cones is likewise precisely predeterminable.

The average center-to-center distances of the etched recesses are 0.1 μm to 100 μm.

The etched cones may also overlap only partially.

The present disclosure relates to the subject matter disclosed in German No. P 35 41 327.1 of Nov. 22, 1985, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A diffusion plate useful for capturing a real image in an optical system, the plate having a roughened semi-transparent surface for diffusing incident radiation and including the improvement wherein said surface comprises inwardly bulging surfaces which are generally parabolic or spherical in profile, each of said inwardly bulging surfaces being formed from cones etched therein to form a roughness, and having a geometry and average center-to-center distances which are precisely predetermined to produce diffused radiation having one of a desired angle of divergence or a desired intensity, and said etched cones have cone angles which are precisely predetermined.

2. Diffusion plate as defined in claim 1, wherein said etched cones have apertures which overlap completely or in part with predeterminable surface coverage.

3. Diffusion plate as defined in claim 1, wherein the geometry of all said bulging surfaces is identical.

4. Diffusion plate as defined in claim 1, wherein the cone geometry of various etched cones is different.

5. Diffusion plate as defined in claim 1, wherein said bulging surfaces have an average center-to-center distance of 0.1 μm to 100 μm.

6. A diffusion plate useful for capturing a real image in an optical system, the plate having a roughened semi-transparent surface for diffusing incident radiaton and including the improvement wherein said surface comprises inwardly bulging surfaces, each inwardly bulging surface being formed from cones etched therein to form a roughness, and having a geometry and average center-to-center distances which are precisely predetermined to produce diffused radiation having one of a desired angle of divergence or a desired intensity, and said etched cones have cone angles which are precisely predetermined and the cone geometry of various etched cones is different and said etched cones constitute first cones and further comprising additional cones which are smaller than said first cones, said smaller additional cones being etched into the surfaces of the larger first cones, said smaller additional cones having center axes which are oriented parallel or at an angle to the center axes of said larger first cones, and wherein the cone geometry and spacing of said smaller additional cones are also precisely predetermined.

7. Method for producing a diffusion plate having a roughed semi-transparent surface which is useful for capturing a real image in an optical system, comprising:
   (a) a step of irradiating a surface of a light transmitting material with heavy ions perpendicularly to such surface to produce latent nuclear traces of a certain depth in the material;
   (b) a step of tempering the irradiated surface for a predetermined time and at a predetermined temperature to partially cure the nuclear traces;
   (c) a step of etching the surface bearing the nuclear traces to form etched cones in the areas of the nuclear traces, said etching being carried out until the apertures of the cone angle overlap partially or completely with said etched cones having cone angles which are precisely predetermined.

8. Method of producing a diffusion plate as defined in claim 7, wherein:
   said irradiating step comprises irradiating common glass with uranium ions of a specific energy of 14 MeV/nucleon and with a dosage of $10^6$ ions/cm$^2$ to produce a nuclear trace depth of 100 μm;
   said tempering step comprises tempering the surface for one hour at 400° C.; and
   said etching step comprises etching the surface with a mixture of 90 parts 20% hydrofluoric acid and 10 parts 37% hydrochloric acid for a period of 7 minutes;
   whereby the etched cones so produced have a cone angle of substantially 143°.

9. Method as defined in claim 7, wherein said etching step is effected with a continuously changing etching fluid composition of decreasing selectivity.

10. Method as defined in claim 7, wherein said tempering and etching steps comprise a sequence of stepwise initiated tempering and etching processes.

11. Method as defined in claim 7, wherein said irradiating step includes irradiating the surface of the material with a predetermined dosage of heavy ions per square centimeter so that the etched cones produced by said etching will have a predetermined center-to-center distance.

12. Method as defined in claim 7, wherein said tempering step incudes determining the time and temperature of the tempering so that the subsequently etched cones have a precisely determined cone angle.

13. Method as defined in claim 7, including selecting the ion dosage and ion energy of said irradiating step and the time and temperature of said tempering step and the duration of said etching step so that the geometry and the center-to-center spacing of the etched cones produced by said etching step are precisely determined.

14. Method as defined in claim 7, wherein said irradiating step includes irradiating common glass with uranium ions of a specific energy between 0.5 and 50 MeV/nucleon and an ion dosage between $10^4$ and $10^8$ ions/cm$^2$; and
   said tempering step includes tempering the surfaces for a time between 1 minute and 100 hours at a temperature between 300° and 500°.

15. A diffusion plate useful for capturing a real image in an optical system, the plate having a roughened semi-transparent surface for diffusing incident radiation and including the improvement wherein said surface comprises cones etched therein to form a roughness, said cones each having a geometry and average center-to-center distances which are precisely predetermined to produce diffused radiation having one of a desired angle of divergence or a desired intensity, and said etched cones have cone angles which are precisely predetermined, said diffusion plate being produced by a method comprising:
   (a) a step of irradiating a surface of a light transmitting material with heavy ions perpendicularly to such surface to produce latent nuclear traces of a certain depth in the material;
   (b) a step of tempering the irradiated surface for a predetermined time and at a predetermined temperature to partially cure the nuclear traces; and
   (c) a step of etching the surface bearing the nuclear traces to form etched cones in the areas of the nuclear traces, said etching being carried out until the apertures of the cone angles overlap partially or completely.

16. Diffusion plate as defined in claim 15, wherein said etched cones have apertures which overlap completely or in part with predeterminable surface coverage.

17. Diffusion plate as defined in claim 15, wherein said etched cones have bulging surfaces which are generally parabolic or spherical in shape.

18. Diffusion plate as defined in claim 15, wherein the cone geometry of various etched cones is different.

19. Diffusion plate as defined in claim 15, wherein said etched cones have an average center-to-center distance of 0.1 μm to 100 μm.

* * * * *

UNITED STATES PATENT AND TRADEMARK OFFICE
CERTIFICATE OF CORRECTION

PATENT NO. : 4,826,292
DATED : May 2, 1989
INVENTOR(S) : Reimar SPOHR et al.

It is certified that error appears in the above-identified patent and that said Letters Patent is hereby corrected as shown below:

In the heading of the Patent, under [75], please change the third named Inventor's name from "Dieter Bürchner" to --Dieter Bürckner-- and the fourth named Inventor's name from "Poppl Thomas" to --Thomas Popp--.

Signed and Sealed this

Twentieth Day of February, 1990

Attest:

JEFFREY M. SAMUELS

Attesting Officer

Acting Commissioner of Patents and Trademarks